Jan. 4, 1955 J. V. MARTENS 2,698,878

VOICE FREQUENCY RECEIVER

Filed April 5, 1952

5 Sheets-Sheet 1

INVENTOR
J. V. MARTENS
BY
ATTORNEY

INVENTOR
J.V. MARTENS
BY
Robert Harding Jr.
ATTORNEY

INVENTOR
J. V. MARTENS
BY
Robert Harding Jr
ATTORNEY

INVENTOR
J. V. MARTENS
BY
Robert Harding Jr.
ATTORNEY.

Jan. 4, 1955 J. V. MARTENS 2,698,878

VOICE FREQUENCY RECEIVER

Filed April 5, 1952 5 Sheets-Sheet 5

INVENTOR
J. V. MARTENS
BY
Robert Harding Jr.
ATTORNEY

United States Patent Office 2,698,878

Patented Jan. 4, 1955

2,698,878

VOICE FREQUENCY RECEIVER

Jean Victor Martens, Antwerp, Belgium, assignor to International Standard Electric Corporation, New York, N. Y., a corporation of Delaware Application April 5, 1952, Serial No. 280,728

Claims priority, application Netherlands April 27, 1951

7 Claims. (Cl. 179—16)

Figure 1:
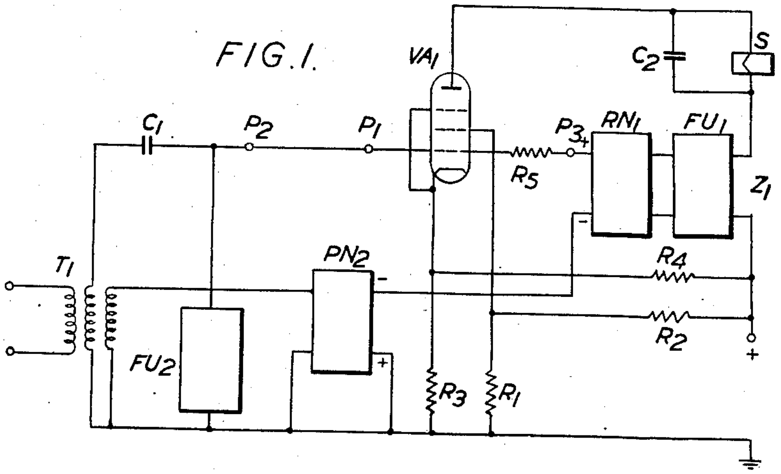

The invention relates to voice frequency receivers such as used in telecommunication systems, e. g. automatic telephone systems operating over long distance, carrier frequency systems, etc.

In order to transmit signals via telephone circuits incorporating voice frequency amplifiers, it is necessary to use signalling frequencies which can be amplified by said amplifiers. Otherwise, special by-pass circuits would be necessary and these possess drawbacks.

Signalling frequencies included in the voice frequency range are therefore advantageous and have been extensively used. However, with these voice frequency receivers, there exists the danger of speech currents unduly operating the signal receiver.

An object of the invention is to realize a novel voice frequency receiver of the single frequency type providing a very high degree of immunity against speech currents which simulate more or less the signalling frequency.

Another object of the invention is to realize a voice frequency receiver in which no distortion is introduced when converting the incoming V. F. impulses into D. C. impulses.

Before outlining the detailed features of the invention, some general considerations on known practice are desirable. In what follows, the following definitions will be used:

Carrier, the V. F. signal of constant amplitude which is generated;

Modulated carrier, the carrier when it is applied on the line by the impulse sending relay, the envelope of said modulated carrier being thus of rectangular shape;

Distortion, the difference between the length of the incoming V. F. impulses and the length of the converted D. C. impulses (in millisecs.);

Delay, the time between the application of an incoming V. F. impulse and the beginning of the corresponding D. C. impulse (msecs.).

A V. F. signal receiver has two essential parts, i. e. an amplifier selectively amplifying the carrier and working into an output relay which transmits D. C. impulses corresponding to the envelope of the modulated carrier, and a protective device preventing the operation of said relay when speech currents simulating the carrier reach the receiver. The former will be called the conversion circuit, while the latter will be called the guard circuit.

Various types of conversion circuits are already known. The carrier may be amplified, rectified and the D. C. currents applied to the output relay. The rectified voltage may also be applied to the grid circuit of an output valve whose anode circuit includes the output relay. With the latter arrangement, it is also possible to use a single valve which also performs the function of amplifying the carrier, operating as a reflex valve. The rectifying network may be omitted by so applying the amplified carrier to the output valve, that the latter works as a detector. The output relay included in the anode circuit of the detector valve being operated by the increased plate current.

Several types of guard circuits are also known. The general function of the circuit is to amplify the speech currents which generally accompany signal simulating speech and use the resulting energy to prevent the output relay from operating unduly. In the general types of guard circuits described hereinafter, they may either be selective, i. e. operate only for well determined and narrow frequency bands, or they may have a flat response over a large bandwidth.

A mechanical guard circuit may be used wherein the guard frequencies are amplified, rectified and the output of the rectifier fed to a relay whose operation prevents the output relay from being energized. This is evidently similar in principle to the first conversion circuit mentioned above.

An active electrical guard circuit may be used without employing relays and wherein the guard frequencies are amplified, rectified and the resulting D. C. voltage applied to the grid of the output valve so as to reduce its anode current thereby preventing the operation of the output relay. This is evidently similar in principle to the second and third conversion circuits mentioned above.

A passive electrical guard circuit has also been used, but hitherto it has merely been an auxiliary protection which is only useful to enhance the safeguard provided by the main guard circuit. It utilizes a voltage limiting device inserted in the path of the carrier.

In this manner, the amount of carrier available at the output of this device will be reduced merely by the presence of other speech frequencies.

The existing circuits have three main deficiencies.

The first resides in the fact that it is not possible to combine small distortion with speech immunity. Distortion largely depends upon the bandwidth of the selective signal amplifier. A faithful reproduction of the rectangular envelope produced by a normal telephone dial, i. e. 10 c./sec., requires flat amplification from at least F—50 to F+50 c./sec., where F is the carrier frequency. With such a bandwidth, protection against speech becomes very difficult.

The second resides in the difficulty in choosing the appropriate time constants for the conversion and guard circuits. Both these circuits have minimum time constants resulting from the delay in the operation of the relays, the transient time of the resonant circuits, and the time constants of the smoothing circuits for the rectifiers. If the total time constant of the guard circuit is higher than that of the conversion circuit, it is obvious that the application of speech voltages containing a certain amount of carrier will result in an undue operation of the output relay since the guard circuit will operate too late. If the overall time constant of the guard circuit is lower than that of the conversion circuit, the same will happen at the end of a series of speech voltages containing the carrier since the energy of the guard circuit will be dissipated at a time when it is still required for neutralizing the conversion circuit. Hence both time constants should be as near to one another as possible, the slightest difference resulting in false operations.

The third is the dependency on valve characteristics. The carrier applied to V. F. receivers is allowed to vary between broad limits, e. g. ±10 decibels, while the operation of the receiver should remain satisfactory. Therefore, the response of the amplifier circuit should not be a function of the applied signal amplitude. The output of the amplifier should preferably be restricted to two definite values, the first corresponding to the absence of signal and the second to the presence of the signal in sufficient quantities. This has already been achieved, but, with the drawback that the threshold value, i. e. the signal for which the output of the amplifier abruptly changes from one value to another, is dependent on the valve characteristics. Readjustments are therefore necessary when a valve has to be replaced.

A feature of the invention resides in a voice frequency receiver such as used in telecommunication systems in which the carrier frequency signal transmitted over the incoming line for signalling or dialling purposes and fed to the input of said receiver, is multiplied therein by a frequency multiplier, the A. C. energy at the multiplied frequency being used to operate the output relay sending out D. C. impulses from said receiver on to the outgoing line.

Another feature of the invention resides in a voice frequency receiver in which said frequency multiplication of the incoming A. C. signal is effected by a voltage limiter.

Yet another feature of the invention resides in a voice frequency receiver comprising an amplifier between the input terminals connected to the incoming line and said frequency multiplier, said amplifier having a higher gain in the band of maximum speech energy than for the carrier frequency signal.

Figure 2:
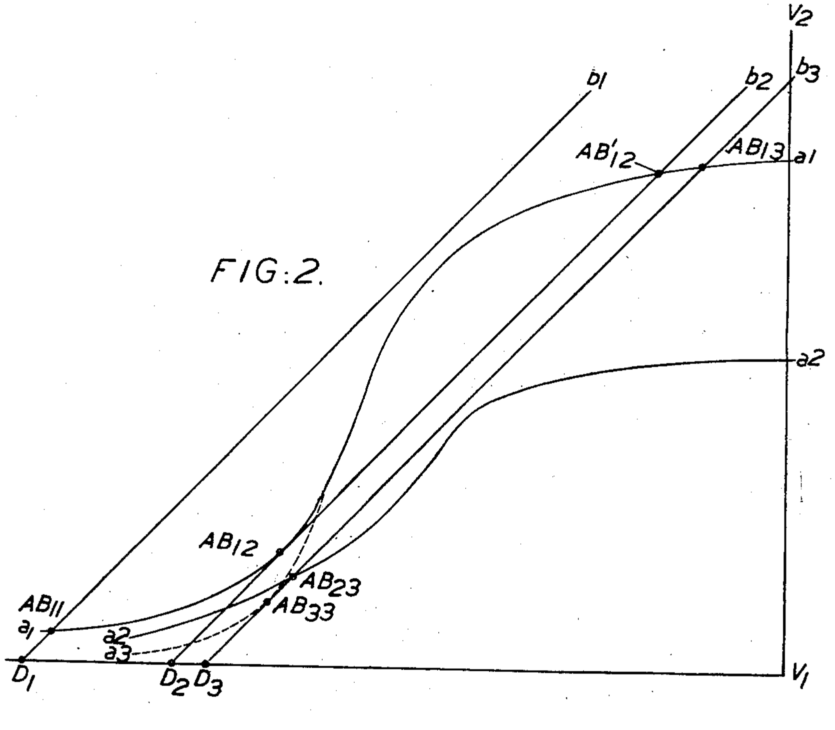
Figure 3:
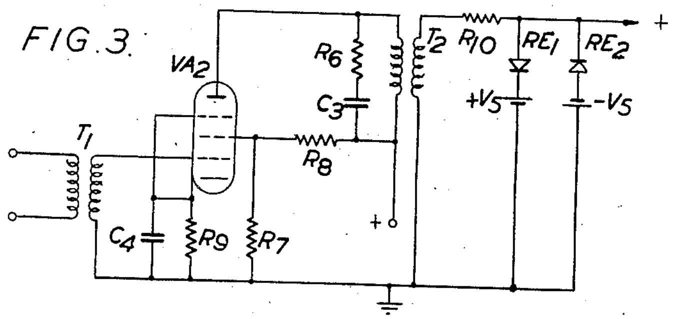
Figure 5:
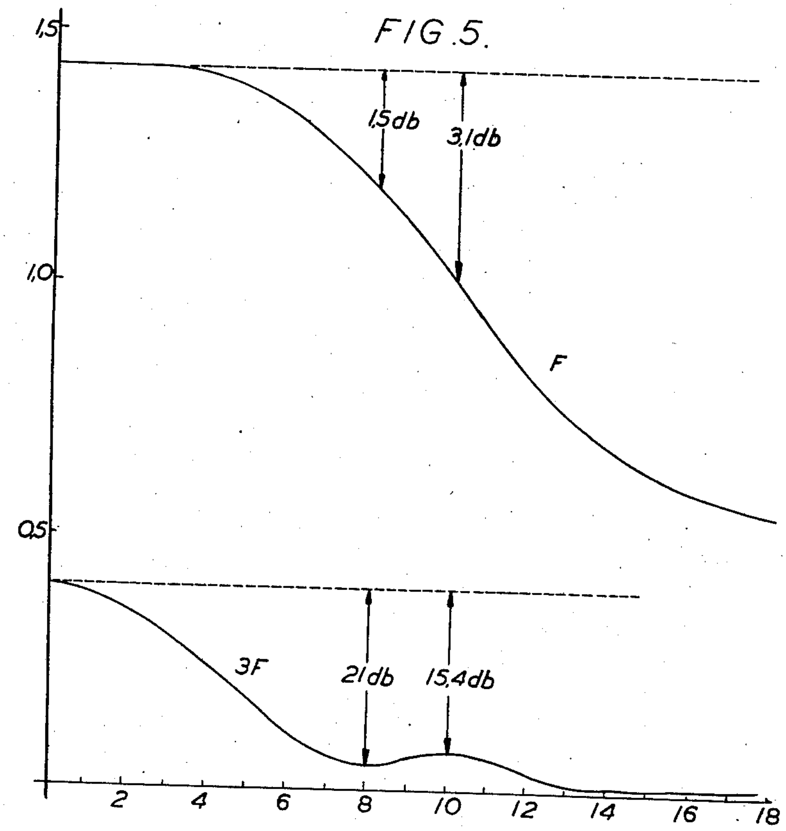
Figure 4:
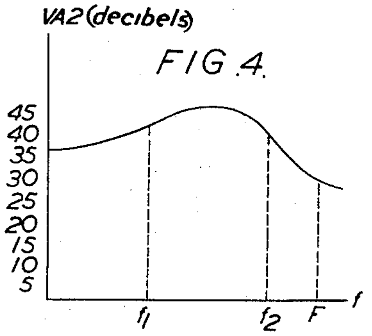
Figure 6:
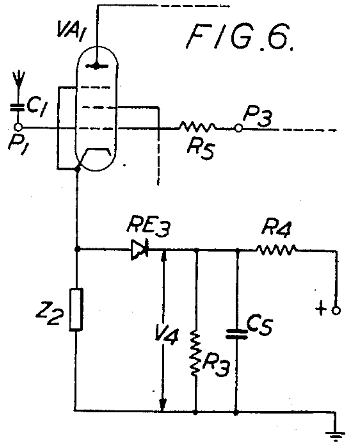
Figure 7:
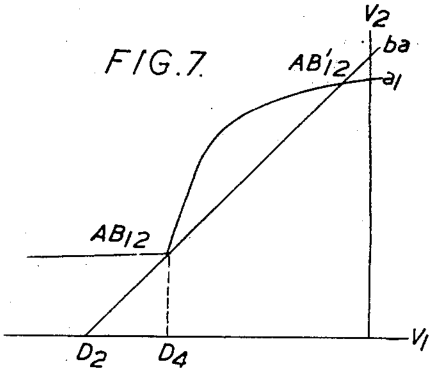
Figure 8:
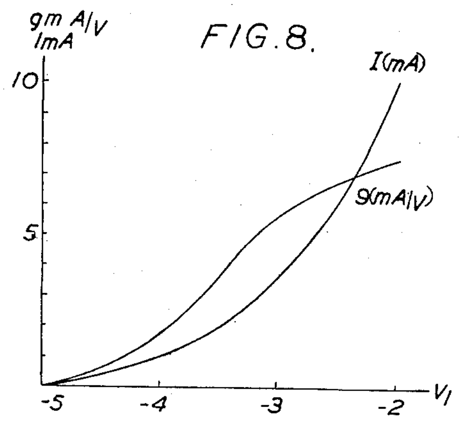
Figure 9:
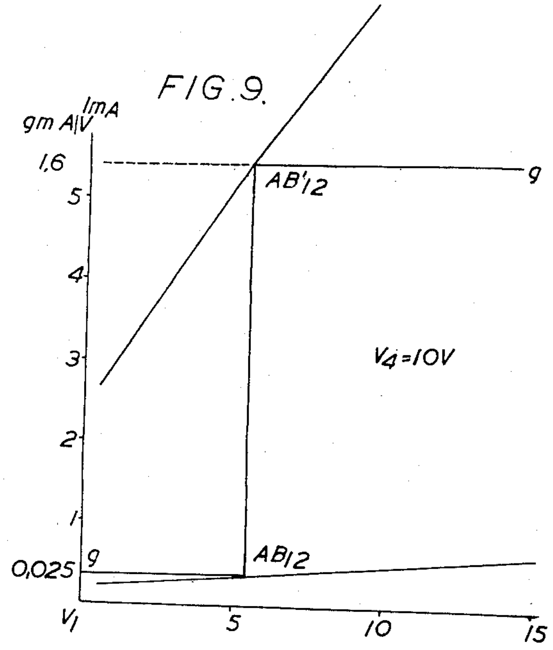
Figure 10:
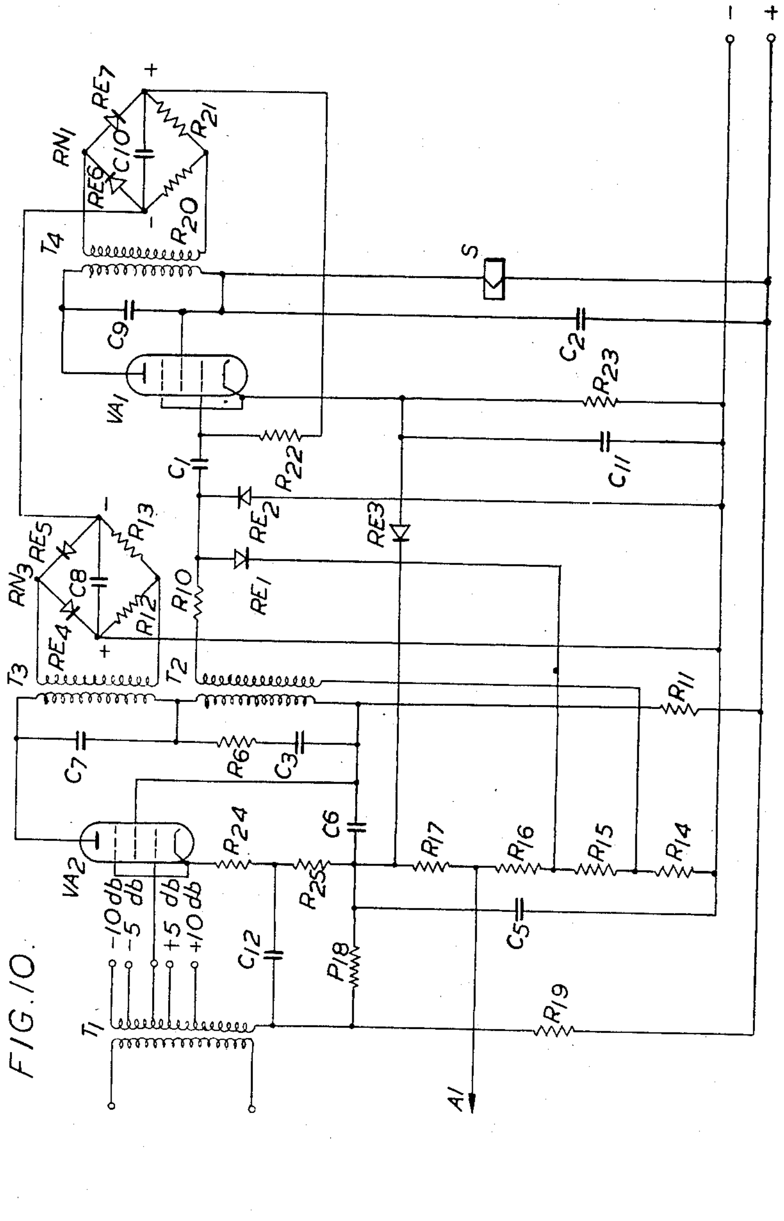

The above mentioned and other objects and features of the invention will become more apparent and the invention itself will be best understood by referring to the following description of the embodiment taken in conjunction with the accompanying drawings which represent:

Fig. 1, a voice frequency receiver of known design;

Fig. 2, characteristic curves relating to the arrangement shown in Fig. 1;

Fig. 3, a frequency multiplication arrangement in accordance with the invention;

Fig. 4, the response curve of the amplifying stage shown in Fig. 3;

Fig. 5, characteristic curves relating to the arrangement shown in Fig. 3;

Fig. 6, the output stage of the voice frequency receiver shown in Fig. 1, modified in accordance with the invention;

Fig. 7, characteristic curves relating to the circuit shown in Fig. 6;

Fig. 8, another set of characteristic curves relating to the arrangement shown in Fig. 6;

Fig. 9, yet another characteristic curve relating to the arrangement shown in Fig. 6;

Fig. 10, a complete embodiment of a voice frequency receiver in accordance with the invention.

Reference will first be made to the circuit shown in Fig. 1, in which a voice frequency receiver of known design is shown. The conversion circuit which is shown therein is of the third type mentioned above, i. e. the rectified carrier voltage is applied to the grid circuit of the output valve whose anode circuit includes the output relay and the valve works in a reflex manner since it is also used to amplify the original A. C. carrier before it is rectified and applied to the grid circuit of the amplifying valve.

$VA_1$ is the output valve working in a reflex manner and is shown here to be a pentode whose anode is connected to positive battery via the winding of the output relay S and via the input impedance $Z_1$ of a tuned network $FU_1$. In the usual manner, the suppressor grid is connected to the anode while the screen grid is positively biassed by means of the potentiometer arrangement $R_1R_2$. The control grid is connected via terminals $P_1$ and $P_2$ and via condenser $C_1$ to the first secondary winding of transformer $T_1$ whose primary winding is assumed to be connected to the incoming line. Terminal $P_2$ is shown to be connected to ground via the resonant network $FU_2$ while the cathode of valve $VA_1$ is positively biassed by means of the potentiometer arrangement including resistances $R_3$ and $R_4$.

The output of the resonant network $FU_1$ included in the anode circuit of the valve leads to a rectifying network $RN_1$ whose output is applied to the control grid via terminal $P_3$ and the grid resistor $R_5$, the polarity being as indicated in the figure. The lower output terminal of the rectifying network $RN_1$ is connected to the upper output terminal of the rectifying network $RN_2$, the input of which is derived from a second secondary winding provided on the input transformer $T_1$. The polarity is as indicated in the figure.

The operation of the circuit may be explained as follows:

The positive potential to which the cathode of the valve $VA_1$ is biassed is such that in the absence of incoming signals, the grid circuit of the valve is negatively biassed to such an amount that the plate current is very small, e. g. one tenth of its normal value. The operating current of relay S which is by-passed by the condenser $C_2$ is comprised between said value of plate current and the normal value. Denoting the normal value of the plate current by $I_0$ and the operating current for the relay S by $i_s$, we have therefore the relation:

$$\frac{I_0}{10} < i_s < I_0 \qquad (1)$$

Consequently, relay S will only operate when the valve $VA_1$ is thrown from its near cut-off condition into operation at the normal bias. This change is produced by the application of the carrier signal having a frequency F. The carrier will be applied to the control grid via the condenser $C_1$ and terminals $P_2$ and $P_1$, the resonant network $FU_2$ having a high impedance at the frequency F. Although the valve is practically in a cut-off condition, it will amplify the carrier signal because the impedance $Z_1$ offered by the resonant network $FU_1$ is also high at the carrier frequency F. The amplied carrier will then be rectified by the rectifying network $RN_1$ and the resulting D. C. positive potential will be applied via terminal $P_3$ to the control grid. Evidently, the effect of this positive voltage will be to increase the amplification of the valve $VA_1$ and to accelerate the transition from the cut-off condition to the normal bias operation. The anode current will, therefore, rapidly increase after the carrier is applied and relay S will operate.

In order to appreciate certain features of the invention, it will be useful to consider the operation of the circuit shown in Fig. 1 by referring to the characteristic curves shown in Fig. 2. The curved characteristics $a_1$, $a_2$ and $a_3$ shown therein, represent a plot of the rectified voltage $V_2$ appearing at the output of the rectifying network $RN_1$ versus the grid voltage $V_1$, in response to a carrier voltage $V_F$ applied to the primary winding of transformer $T_1$. Linear characteristics $b_1$, $b_2$ and $b_3$ are also shown in Fig. 2 and represent the rectified voltage $V_2$, in response to a positive D. C. voltage $V_1$ being applied to the control grid via the grid resistor $R_5$, terminal $P_3$ being assumed to be disconnected from said grid resistor. The curves $a_1$ and $a_2$ differ due to the fact that the value of the carrier voltage $V_F$ is different, i. e. for the characteristic $a_2$ it is about half the value of that corresponding to the characteristic $a_1$. In view of the linear relationship between $V_2$ and $V_1$, we have:

$$V_2 = V_1 + (V_3 + V_4) \qquad (2)$$

where $V_3$ is the D. C. voltage provided at the output of the rectifying network $RN_2$ and $V_4$ is the fixed cathode bias provided by the potentiometer arrangement $R_3R_4$. Accordingly, the characteristics $b_1$, $b_2$ and $b_3$ are straight lines inclined at 45°. For moderate values of $V_3+V_4$, i. e. point $D_3$, the equilibrium point will be determined by the intersection of curve $a_1$ and the straight line $b_3$.

This equilibrium point $AB_{13}$ corresponds to a low bias and to a high anode current which is greater than $i_s$. Accordingly, relay S will operate. For higher values of $V_3+V_4$, i. e. point $D_1$, the equilibrium point $AB_{11}$ will now be determined by the intersection of the straight line $b_1$ with the curve $a_1$. This equilibrium point is in the cut-off range of the valve and accordingly relay S cannot operate since the anode current is too small.

If the amount of the carrier signal voltage $V_F$ is reduced, the curve $a_1$ is replaced by a curve $a_2$ and even with moderate values of $V_3+V_4$, i. e. point $D_3$ and line $b_3$, relay S cannot operate since the equilibrium point $AB_{23}$ does not correspond to an anode current large enough for the energization of the relay.

The guard circuit shown in Fig. 1 is of the active electical type and provides the negative D. C. voltage to the control grid of valve $VA_1$ from the output of the rectifying network $RN_2$. Accordingly, when speech voltages are applied to $T_1$, $V_3$ will be increased resulting also in an increase of $V_3+V_4$ whereby the straight line characteristics are shifted towards the left (Fig. 2). In these conditions, the valve $VA_1$ can only be opened if large amounts of carrier are present. An advantage of the arrangement shown is the small variation of envelope distortion with carrier level since the guard circuit will introduce an AVC effect, this being due to the fact that the guard circuit also responds to the carrier frequency.

The disadvantages of the arrangement shown in Fig. 1 are a small sensitivity, i. e. 2 mw. are needed at zero relative level, an insufficient immunity against speech which is, in fact, inherent to all circuits using an active guard arrangement and the dependency on valve characteristics. The last is illustrated in Fig. 2 where the curve $a_3$ corresponds to the curve $a_1$ for a different valve, the amount of carrier $V_F$ having remained the same. It is clear from Fig. 2 that the critical point $AB_{33}$ where curve $b_3$ is tangent to curve $a_3$ is different from the critical point $AB_{12}$ where the line $b_2$ is tangent to the curve $a_1$. Hence, adjustments of $V_4$ are necessary in order to shift point D.

As explained above, the bandwidth in which the receiver operates is conditioned by distortion requirements and should approximately extend from $F-50$ to $F+50$ C. P. S. This bandwidth evidently applies to the modulated carrier taken at the detector part of the VF receiver. By multiplying the carrier frequency F by $n$, between the input of the receiver and the detector part of the receiver, the bandwidth as measured at the input of the detector extends from $nF-50$ to $nF+50$ C. P. S. which corresponds to a band width at the input of the receiver of only $$F-\frac{50}{n} \text{ to } F+\frac{50}{n} \text{ C.P.S.}$$

A frequency multiplication can be obtained by inserting between terminals $P_1$ and $P_2$ (Fig. 1), a non-linear element which will be used to produce harmonics of the carrier frequency. In this case, the resonant unit $FU_1$ which previously offered a high impedance at the frequency F of the carrier, should now offer a high impedance at the frequency $nF$ where $n$ is the $n$th harmonic of the carrier. In doing so, and if $k$ is the percentage of the $n$th harmonic produced by the non-linear element, the receiver sensitivity will be reduced by a factor equal to $$\frac{100}{k}$$

Hence, an additional valve, which is already necessary if the signal level should be less than 2 mw. at zero relative level, should be foreseen. The advantages of the arrangement are that for equal distortion, the immunity can be made $n$ times better and also that the components of the resonant unit $FU_1$ and more particularly the condensers included therein, can be made $n$ times smaller.

The immunity can be improved further by transferring the function of the active guard circuit shown in Fig. 1, as much as possible to a positive guard circuit. If the frequency multiplication mentioned above is produced by a voltage limiter, e. g. symmetrical, the third harmonic of the carrier signal which will be present at the output of the voltage limiter will decrease rapidly when the level of the speech voltage which is present, is raised. Further, by inserting an amplifying stage between the input of the voice frequency receiver and the voltage limiter, any amount of passive protection can be obtained from the limiter by shaping the response curve of the amplifying stage so as to have a higher gain for the speech voltages than for the carrier.

These improvements are shown in Fig. 3 which represents only the input stage of a voice frequency receiver. This input stage includes the amplifying valve $VA_2$ whose anode is connected to positive battery via the primary winding of transformer $T_2$ which is shunted by the series combination of condenser $C_3$ and resistor $R_6$. In the usual manner, the suppressor grid is connected to the cathode while the screen grid is positively biassed by means of the potentiometer arrangement $R_7R_8$. The control grid is connected to the secondary winding of the input transformer $T_1$ whose primary winding is connected to the incoming line. The cathode is positively biassed by means of the resistor $R_9$ which is shunted by condenser $C_4$.

The secondary winding of transformer $T_2$ is connected to the output part (not shown) of the voice frequency receiver via a voltage limiter comprising rectifiers $RE_1$ and $RE_2$ oppositely poled and suitably biassed to a voltage, indicated by batteries, equal to $\pm V_5$. Hence, the A. C. wave developed across the secondary winding of transformer $T_2$ will be clipped between the values $+V_5$ and $-V_5$ whereby harmonics of said wave will be produced and fed to the output stage (not shown) of the voice frequency receiver. Further, the use of resistor $R_6$ and condenser $C_3$ shunted across the primary winding of transformer $T_2$, will result in a gain curve for the valve $VA_2$ which is substantially as shown in Fig. 4 from which it can be seen that the gain at the carrier frequency F is substantially less than the gain obtained in the zone of maximum speech level between the frequencies $f_1$ and $f_2$.

Fig. 5 shows characteristic curves for the output voltage issuing from the voltage limiter. The top curve represents the amount of carrier at frequency F for a carrier voltage at the limiter input which is equal to 10 volts. The clipping voltages for said limiter being assumed to be equal to $\pm 1.5$ volts. This curve is plotted in function of the speech voltage which is mixed with the carrier signal. The bottom curve represents the amount of the third harmonic of the carrier, i. e. 3 F, which is produced at the output of the voltage limiter. Again, this is for a value of the carrier voltage at the limiter input equal to 10 volts and it is also plotted against the speech voltage which is mixed with the carrier signal. Both curves show a decrease of output when the amount of speech voltage is increased, but the decrease of the third harmonic is much greater than the decrease of the fundamental carrier frequency voltage. As shown, for the third harmonic, a drop of 21 decibels is obtained when the speech voltage has reached 8 volts. This will be reduced until the speech waves reach 10 volts, i. e. become equal to the amount of carrier signal and from then on will continue to decrease.

Due to the response curve of valve $VA_2$ (Fig. 4), it is evident that the amount of speech which is necessary at the input of the voice input receiver to obtain a drop of 15 decibels, i. e. for a speech voltage of 10 volts, can be quite small since more amplification is obtained for the speech waves than for the carrier signal.

Obtaining the third harmonic from a voltage limiter offers the advantage that the available signal of frequency 3 F received at the input of the output stage, i. e. at the output of the limiter, depends only on the composition of the signal at the input, and not or hardly on the level of said signal. It will be realized that this is a very important advantage since one of the greatest difficulties in designing voice frequency receivers resided in making the operation of said receiver independent of the input level although the latter may vary considerably, i. e. $\pm 10$ decibels.

As shown in Fig. 2, curves $a_1$ and $a_2$ clearly indicate that the difference in the cut-off characteristics between two valves makes the adjustment of the fixed bias fairly difficult, i. e. the adjustment of voltage $V_4$ produced at the cathode of valve $VA_1$ in Fig. 1. Even when the characteristics of two valves correspond for a reasonable amount of negative bias, they may differ widely when the bias reaches the cut-off region. In some extreme cases, when the curvature of the characteristic curves, e. g. $a_1$ and $a_3$, is too small, i. e. at the points $AB_{12}$ and $AB_{33}$, the operation is obviously not reliable and the corresponding valve would have to be discarded. Evidently, the ideal characteristic would imply a discontinuity for the slope of $V_2$ with respect to $V_1$ for the curves such as $a_1$, i. e. a discontinuity for $$\frac{dV_2}{dV_1}$$

Also, whatever the variations in characteristics produced by using different valves, the coordinates of the discontinuity point such as $AB_{12}$ should be invariable. Further, at the left of the discontinuity point, the slope should be as small as possible and in any case much smaller than unity which is the slope of the straight line characteristics such as $b_2$. If and when these conditions are fulfilled, the limiting value of $V_3+V_4$ for which operation is possible, i. e. point $D_2$ in Fig. 2, will no longer depend on the particular characteristics of the valve used.

Referring to Fig. 6, the latter shows an output stage for a voice frequency receiver which permits to obtain the above mentioned characteristic.

Fig. 6 shows part of the output circuit of the voice frequency receiver and in particular the valve $VA_1$, whose control grid connected to terminal $P_1$, is fed via condenser $C_1$ from the input stage incorporating the voltage limiter (Fig. 3). Only the cathode circuit of valve $VA_1$ is shown in Fig. 6, since the remaining part of the output circuit can be assumed to be of similar design as that shown in Fig. 1. In Fig. 6 a bias is still provided for the cathode of valve $VA_1$ by means of the potentiometer arrangement $R_3$, $R_4$ but this is normally ineffective in view of the rectifier $RE_3$ since normally, when no voltage is applied to the control grid of valve $VA_1$, the large impedance $Z_2$ inserted between the cathode and ground will provide an automatic bias, which is smaller than the bias provided at the junction point of resistors $R_3$ and $R_4$. This automatic bias is, however, large enough to reduce the anode current of the valve $VA_1$ to a low value, e. g. one tenth of its nominal value.

Assuming that the positive potential on the right-hand side of rectifier $RE_3$ is $V_6$ volts higher than the potential at the cathode of the valve, and that the potential at the control grid is positively increased starting from zero, the potential at the cathode of the valve will also increase and, in fact, closely follow the increase of positive potential at the control grid. This is due to the fact that the impedance $Z_2$ is chosen to be very high whereby when the voltage is increased at the control grid, the plate current will not vary substantially. As a result, the mutual conductance $g$ and consequently the amount of rectified carrier $V_2$ will remain small and practically invariable in view of the considerable local feedback developed over the impedance $Z_2$. This corresponds to the portion of the curve $a_1$ shown in Fig. 7 located at the left of the critical point $AB_{12}$. As soon as the positive voltage fed to the control grid becomes higher than $V_6$, the potential at the cathode which follows almost exactly the variations of the control grid potential, will become higher than $V_4$, the voltage developed across the resistor $R_3$, and consequently, the rectifier $RE_3$ will now pass current. This will greatly reduce the resulting D. C. resistance between cathode and ground since the resistance of the rectifier $RE_3$ in a conductive condition in series with the parallel combination of $R_3$ and $R_4$, will be appreciably lower than the high impedance $Z_2$. Hence, the D. C. voltage at the cathode will no longer follow the voltage applied at the control grid and the desired discontinuity at point $AB_{12}$ (Fig. 7) will be obtained since the mutual conductance $g$ of the valve $VA_1$ will suddenly increase. This discontinuity effect will be greatly enhanced due to the effect of the condenser $C_5$ which will remove the A. C. local feedback as soon as the rectifier $RE_3$ becomes conductive. This sudden elimination of the local A. C. feedback will therefore cause a sharp increase of the rectified carrier $V_2$ at a point corresponding with the critical point $AB_{12}$ shown in Fig. 7.

The abscissa of the discontinuity point $AB_{12}$ is defined by the difference between the cathode potential across the impedance $Z_2$ and the potential $V_4$ developed across resistor $R_3$. The latter only depends upon resistors $R_3$ and $R_4$ and the supply voltage and can thus be closely controlled. The former depends on the cathode current of the valve $VA_1$ which is closely controlled by the local D. C. feedback provided by the impedance $Z_2$. On the other hand, the ordinate of the discontinuity point $AB_{12}$ is proportional to the gain of the valve $VA_1$ which, at this point, is still controlled by large D. C. and A. C. local feedback. This ordinate is also proportional to the signal provided at the terminal $P_1$ but if a voltage limiter is used in the input stage (Fig. 3), this signal is substantially constant over the entire level range for which the voice frequency receiver should operate.

Referring to Fig. 8, the latter shows ordinary smooth characteristics without discontinuities for the cathode current and mutual conductance of the valve $VA_1$. Using the cathode circuit arrangement shown in Fig. 6, a discontinuous characteristic can now be obtained both for the cathode current and for the resulting mutual conductance. These are shown in Fig. 9. The left-hand parts of the curves which are nearly horizontal straight lines, correspond to the characteristics on the left-hand side of the critical point $AB_{12}$ (Fig. 7), when the cathode impedance is very high, i. e. for all intents and purposes equal to the impedance of $Z_2$ which for the curves given, can be assumed to be equal to 30,000 w. At the critical point $AB_{12}$, there will be a sharp increase in the cathode current and also in the resulting mutual conductance. This will evidently be due to the sudden change in the impedance between cathode and ground (Fig. 6) which will now be practically equal to the sum of the forward resistance of rectifier $RE_3$ and the resistance $R_3$. For the curves shown, this can be assumed to be equal to 1500 w. At the point $AB'_{12}$ (Figs. 7 and 9) the cathode current will continue to increase at a rate which is greater than the rate of increase before reaching the critical point $AB_{12}$, while on the other hand the resulting mutual conductance will increase after passing the point $AB'_{12}$ but, of course, very slowly. It is to be noted that the increase in the resulting mutual conductance is so sharp that it has been represented on a logarithmical scale. It is obvious that the variations in the rectified carrier $V_2$ will be similar to those of the resulting mutual conductance.

For the type of valve which can be used for the circuit shown in Fig. 6, and referring to Fig. 8, the variations in the cathode characteristics may be expected to be limited to shifts of 0.5 volt to the left or to the right. Hence, the abscissa of the critical point $AB_{12}$ will suffer corresponding shifts. Then considering Fig. 7, it is evident that a shift in the direction of $V_1$ (horizontal) may be compensated by an equal shift in the direction of $V_2$ (vertical), the latter meaning a proportional change of the signal. Hence, the relative importance of a shift in the vertical direction may be reduned by taking the ordinate of the critical point $AB_{12}$ sufficiently large. For example, with shifts of $\pm 0.5$ volt for the cathode current characteristic of the valve $VA_1$, an ordinate of 5 volts for the critical point $AB_{12}$ will mean that the variation of receiver sensitivity can be limited to $$\pm\frac{0.5}{5}=\pm 10\%$$

Fig. 10 shows a complete embodiment of a voice frequency receiver designed in accordance with the principles cited above. In this figure, elements which perform functions identical to elements previously included in Figs. 1, 3 and 6, will bear the same designation. The voice frequency receiver comprises two main parts, an input stage including the valve $VA_2$ and an output stage including the valve $VA_1$. The control grid of valve $VA_2$ can be connected to various tappings provided on the secondary winding of the input transformer $T_1$, said tappings, as indicated, corresponding to the relative level of the incoming signals which are impressed across the terminals of the primary winding.

The suppressor grid of valve $VA_2$ is connected to the cathode in the usual manner while the screen grid is provided with positive voltage coming from the positive battery via resistor $R_{11}$. The screen grid is decoupled to the cathode circuit by means of condenser $C_6$. The anode of valve $VA_2$ is also connected to positive battery via resistor $R_{11}$ but through the primary windings of transformers $T_2$ and $T_3$ in series. Transformer $T_2$ obviously corresponds with that shown in Fig. 3 and its primary winding is shunted by the series combination of condenser $C_3$ and resistor $R_6$. In the same manner as that shown in Fig. 3, its secondary winding is connected to the voltage limiter comprising rectifiers $RE_1$ and $RE_2$, via resistor $R_{10}$. The transformer $T_3$ is part of the active electrical guard circuit whose action will supplement the action of the passive electrical guard circuit provided by the voltage limiter, as previously explained. Obviously, if frequency multiplication is performed, and although the third harmonic is to be used, the fifth harmonic of the carrier signal F will also be produced and one should prevent the operation of the voice frequency receiver by means of the fifth harmonic of incoming signals having a frequency lower than that of the carrier.

Hence, the transformer $T_3$ will be tuned by means of condenser $C_7$ across its primary winding to a frequency equal to $$\frac{3F}{5}$$

since the fifth harmonic of this frequency might cause the operation of the output relay S if it occurs in sufficient quantities. Signals at this frequency will be fed from the secondary winding of transformer $T_3$ to a rectifying network $RN_3$ which comprises the rectifiers $RE_4$, $RE_5$ and the resistors $R_{12}$ and $R_{13}$. The output of the rectifying network is shunted by the smoothing condenser $C_8$.

It may be noted that since frequencies approximately equal to $$\frac{3F}{5}$$

fall well inside the range of maximum speech frequencies, a supplementary protection will be obtained, but the largest amount of protection will be obtained due to the action of the voltage limiter. In the latter, rectifier $RE_1$ is positively biassed to $+V_5$ which voltage is developed across resistor $R_{15}$. This positive bias is of course made with respect to the lower terminal of the secondary winding of transformer $T_2$ which is connected to the junction point of resistors $R_{15}$ and $R_{14}$, the latter serving to obtain a negative bias of $-V_5$ for the oppositely poled rectifier $RE_2$. It is to be noted that these resistors $R_{14}$ and $R_{15}$ are part of a potentiometer arrangement arranged from positive battery to ground and comprising also resistors $R_{16}$, $R_{17}$, $R_{18}$ and $R_{19}$. Due to the fact that resistor $R_{18}$ is included in the grid cathode circuit of valve $VA_2$, a stabilizing D. C. effect is obtained. This is useful since the cathode current flowing through the potentiometer device is also used to provide the fixed voltages required in the cathode grid circuit of the output valve $VA_1$ and for the voltage limiter.

The latter, in which the rectifiers $RE_1$ and $RE_2$ are crystal diodes, is designed to deliver an output of third harmonics to the output valve $VA_1$ which is substantially independent of the signal level, e. g. for variations of signal level of ±10 decibels around the nominal level, the third harmonic output varies by about ±1 decibel only. This small variation therefore allows a close control of the detector operation and makes the bandwidth almost independent from the level of the signal.

The anode of the output valve $VA_1$ is connected to positive battery via the primary winding of transformer $T_4$ which, together with the tuning condenser $C_9$, corresponds to the resonant unit $FU_1$ shown in Fig. 1. The circuit to positive battery also includes the output relay S shunted by the by-pass condenser $C_2$. In the usual manner, the suppressor grid of valve $VA_1$ is connected to the cathode while the screen grid is positively biassed as shown in the figure. The output voltage delivered across the secondary winding of transformer $T_4$ is fed to the rectifying network $RN_1$ which comprises the rectifiers $RE_6$, $RE_7$ and the resistors $R_{20}$, $R_{21}$. It is therefore similar to the rectifying network $RN_3$. A smoothing condenser $C_{10}$ is connected across the output of the rectifying network $RN_1$, said ouput being applied to the control grid of valve $VA_1$ via the resistor $R_{22}$. The rectified voltage provided by the rectifying network $RN_1$ comes in opposition to the rectified voltage provided by the rectifying network $RN_3$ (active guard circuit).

The cathode circuit of the valve $VA_1$ is similar to that shown in Fig. 6, the impedance $Z_2$ being obtained by the shunt combination of resistor $R_{23}$ and condenser $C_{11}$. On the other side of the rectifier $RE_3$, the positive voltage is provided across resistors $R_{14}$, $R_{15}$, $R_{16}$ and $R_{17}$, the series combination of these resistors being shunted by condenser $C_5$. Although there is a current flowing in these resistors from battery potential via resistors $R_{18}$ and $R_{19}$, this is small when compared to the current flowing in these four resistors from the cathode of tube $VA_2$. Hence, it is the constant current of valve $VA_2$ which is used to provide the positive voltage $V_4$. The connection shown between resistors $R_{16}$ and $R_{17}$ provides a potential for an alarm circuit (not shown).

In the absence of signal or speech input, the control grid of the tube $VA_1$ is biassed to ground via resistors $R_{22}$, $R_{21}$, $R_{20}$, $R_{13}$, $R_{12}$.

As soon as carrier signal is applied to the primary winding of transformer $T_1$, the control grid of valve $VA_1$ will receive a negative voltage from the rectifying network $RN_3$. As transformer $T_3$ is designed with a high step down ratio, this negative rectified voltage will be small when compared with the positive voltage which is developed at the output of the rectifying network $RN_1$ and also applied to the control grid of valve $VA_1$.

The reason for using a high step down ratio for transformer $T_3$ is to limit the voltage across its secondary winding since otherwise, the condenser $C_8$ might be charged to considerable negative potentials produced by the speech voltages and a carrier signal closely following such negative peaks might be distorted. The positive voltage developed across condenser $C_{10}$ will therefore remove the cut-off condition for the output valve $VA_1$ which was hitherto produced by the high cathode resistor $R_{23}$. This effect will be sharp and cumulative as explained in connection with Fig. 6. When speech is present, the passive guard action produced by the voltage limiter will cause the output of the third harmonic to decrease to a level (Fig. 5) where the voltage developed across condenser $C_{10}$ is no longer sufficient to open valve $VA_1$. To this passive guard action, one should of course add the active guard action produced by the transformer $T_3$.

A further improvement in the cumulative effect obtained in opening the valve $VA_1$ and therefore in operating the output relay S, is obtained due to the fact that the bias voltages $V_5$ which are produced across resistors $R_{14}$ and $R_{15}$ for the voltage limiter will be considerably increased as soon as valve $VA_1$ begins to pass current. Then, the largest part of its cathode current will flow through the rectifier $RE_3$ and through resistors $R_{17}$, $R_{16}$, $R_{15}$ and $R_{14}$ whereby the voltages across the last two resistors will be more than doubled with the result that the clipping voltages being higher, the voltage limiter will deliver more output to the valve $VA_1$ thereby further accelerating the operation of the output relay S. In fact, with such an arrangement, the delay in operating the relay S is merely dependent upon the constants of the relay itself.

It has been mentioned above that the difference between the bias for the output valve should be around 5 volts, i. e. the difference between the abscissae of points $D_2$ and $D_4$ shown in Fig. 7. Correspondingly the ordinate of the critical point $AB_{12}$ is also equal to 5 volts. Assuming that the potential of the cathode of $VA_1$ is also 5 volts in order to be in the cut-off region, an increase in grid potential of 5 volts will thus bring the cathode, which closely follows the grid voltage when the cathode impedance is high, to 5+5 volts. Hence, since this determines the critical point $AB_{12}$, a voltage of 10 volts should be produced by the cathode current of valve $VA_2$ across the resistors $R_{17}$, $R_{16}$, $R_{15}$ and $R_{14}$. Obtaining the 10 volt bias for the rectifier $RE_3$ from the cathode current of valve $VA_2$ has the advantage of sparing power, and with a cathode current of 10 ma. for $VA_2$, the total resistance offered by $R_{17}$, $R_{16}$, $R_{15}$ and $R_{14}$ should be around 1000 w. In order to obtain a sharp discrimination at the critical point $AB_{12}$, the resistor $R_{23}$ will be high. It should also be high in order to limit the cathode current of valve $VA_1$ in the static condition. On the other hand, the static slope of valve $VA_1$ is roughly proportional to the cathode current and should not be too small, otherwise it might be difficult to obtain the required 5 volts to open the valve $VA_1$. This will generally set a maximum limit to the value of the resistor $R_{23}$.

The third harmonic produced by the voltage limiter being roughly one third of the clipping voltage, this will determine the necessary gain which the valve $VA_1$ should produce and in turn this will partly condition $T_4$ and $C_9$. The turns ratio of transformer $T_4$ should be as high as possible since this will reduce the value of condenser $C_9$ but at the same time it should not be too high to cause anode saturation of the output valve.

Condenser $C_{11}$ will affect the slope of $VA_1$ in its cut-off condition whereas condenser $C_5$ will affect the slope of $VA_1$ in its open condition. The ratio between the ordinates of points $AB'_{12}$ and $AB_{12}$ (Fig. 7) will therefore be determined partly by the values of these condensers. Condenser $C_5$ should be reasonably high to enhance the discontinuity at the point $AB_{12}$, but not too high since it would then uselessly increase the voltage produced at the transformer $T_4$ with a resulting anode saturation which would decrease the current through the output relay S. In fact, the value of condenser $C_5$ should be sufficient to bring the abscissa of point $AB'_{12}$ to about −1 volt, bias for which the anode current of $VA_1$ is near its maximum.

Measurements have shown that to obtain ±1 decibel at the output of the voltage limiter in response to variations of ±10 decibels in signal input level, a voltage of minimum 5 volts should be delivered at the secondary winding of transformer $T_2$. Hence, this voltage may vary from 5 volts up to 50 volts (+20 decibels) and the maximum voltage will determine the type of crystal diodes to be used.

The pre-amplifying part of the circuit, i. e. valve $VA_2$ and associated components, are of conventional amplifier design but it should be noted that a D. C. stabilisation factor for the valve $VA_2$ equal to about 10 is obtained due to the use of resistors $R_{24}$, $R_{25}$ and the remaining resistors shunted by condenser $C_5$. Condenser $C_{12}$ is used to by-pass resistors $R_{18}$ and $R_{25}$, a small amount of local A. C. feedback being provided by resistor $R_{24}$.

Although the transformer $T_3$ is tuned to approximately $$\frac{3F}{5}$$

there will nevertheless be a certain amplification of the carrier signal of frequency F the amplification of which may be used to advantage for exactly counteracting the slight increase in harmonic output from the limiter in response to increase of the signal level. In this manner, the bandwidth becomes completely independent from the signal level.

While the principles of the invention have been described above in connection with specific apparatus, it is to be clearly understood that this description is made only by way of example and not as a limitation on the scope of the invention.

I claim:

1. A voice frequency receiver capable of use in a telecommunication system, comprising an amplifier at the input of said receiver for receiving carrier frequency signals, an active guard circuit coupled to a first part of an output circuit of said amplifier, a passive guard circuit coupled to a second part of the output circuit of said amplifier and including a frequency multiplier circuit, the frequency multiplier circuit including means for producing a voltage substantially independent of the output signal amplitude, but dependent upon the frequency composition of said input signal, said active guard circuit including means for producing a voltage in response to the output from said amplifier, means combining the voltages from said frequency multiplier and said active guard circuit, a gating circuit coupled to the output of said combining means and operable in response to voltages of a given level, and an output relay coupled to the output of said gating circuit and operable in response thereto.

2. The voice frequency receiver according to claim 1, wherein said frequency multiplier comprises a voltage limiter circuit including a pair of oppositely poled rectifiers.

3. The voice frequency receiver according to claim 1, wherein said frequency multiplier comprises means for producing a third harmonic of said carrier frequency.

4. The voice frequency receiver according to claim 1, wherein said amplifier produces a higher gain for the range of frequencies in which the speech energy is maximum than for the carrier frequency signals.

5. The voice frequency receiver according to claim 1, and further comprising an output valve having cathode, grid and anode electrodes, said output relay being coupled in the anode circuit of said output valve, said cathode coupled to a point of fixed direct-current potential over a high impedance, an asymmetrical impedance having one terminal connected to a terminal of said high impedance and serially connected with a low impedance, the asymmetrical impedance and the low impedance being connected in shunt with said high impedance, a positive source of potential coupled to the other terminal of said asymmetrical impedance, the potential across said high impedance being lower than the potential across said low impedance when said valve is in a non-conducting condition, the asymmetrical impedance being connected so as to decouple said high and low impedances, and when said valve is rendered conducting by an increase of the carrier frequency signal, the potential at said cathode is increased and the asymmetrical impedance presents a low impedance path to the valve current flow thereby sharply increasing the mutual conductance of said valve, whereupon the anode current is increased sufficiently to operate said output relay.

6. The voice frequency receiver according to claim 5, wherein said frequency multiplier comprises a voltage limiter circuit including a pair of oppositely poled rectifiers; and further comprising means for coupling said voltage limiter circuit between the output of said amplifier and the input of said output valve, and means including the cathode current of said amplifier for providing the biasing potential for said voltage limiter and the potential across said low impedance.

7. The voice frequency receiver according to claim 6, and further comprising means for stabilizing said amplifier so that its cathode current remains substantially unaffected.

References Cited in the file of this patent

UNITED STATES PATENTS 2,282,129 Hadfield ---------------- May 5, 1942